United States Patent [19]

Sauer

[11] 4,385,226
[45] May 24, 1983

[54] ELECTRICALLY HEATED WINDOW

[75] Inventor: Gerd Sauer, Aachen-Laurensberg, Fed. Rep. of Germany

[73] Assignee: Saint Gobain Vitrage, Aubervilliers, France

[21] Appl. No.: 343,985

[22] Filed: Jan. 29, 1982

Related U.S. Application Data

[63] Continuation of Ser. No. 184,272, Sep. 5, 1980, abandoned.

[30] Foreign Application Priority Data

Sep. 8, 1979 [DE] Fed. Rep. of Germany ....... 2936398

[51] Int. Cl.$^3$ ............................................. H05B 3/06
[52] U.S. Cl. ................................. 219/522; 174/68.5; 219/203; 219/541; 219/543; 338/309
[58] Field of Search ............... 219/202, 203, 301, 385, 219/522, 541, 543; 338/307, 308, 309, 314, 327; 174/68.5; 29/620

[56] References Cited

U.S. PATENT DOCUMENTS

| | | | |
|---|---|---|---|
| 2,692,321 | 10/1954 | Hicks | 338/309 X |
| 2,961,522 | 11/1960 | Hammer | 219/543 X |
| 3,067,310 | 12/1962 | Walz et al. | 219/543 X |
| 3,612,745 | 10/1971 | Warren | 174/68.5 |
| 3,659,079 | 4/1972 | Whittemore | 219/522 |
| 3,811,934 | 5/1974 | Glaser | 219/543 X |
| 3,918,783 | 11/1975 | Du Rocher et al. | 219/522 X |
| 4,063,247 | 12/1977 | Sukurai et al. | 219/522 X |

Primary Examiner—Volodymyr Y. Mayewsky
Attorney, Agent, or Firm—Pennie & Edmonds

[57] ABSTRACT

An electrically heated window is disclosed which achieves a more uniform current density at the interface between the resistive heating layer and the current-bearing electrodes to which it is connected. In one embodiment this may be achieved by forming the edge of the electrode in an undulating shape. It may also be done by increasing the surface resistance of the electrode near its edge by, for example, forming the edge so that it is wedge-shaped in cross-section. More uniform current density may also be achieved by using an electrode which has a resistivity that is greater than that of the resitive heating layer. It may also be achieved by use of a high resistivity layer located between the electrode and the resistive heating layer.

4 Claims, 6 Drawing Figures

ELECTRICALLY HEATED WINDOW

This is a continuation of application Ser. No. 184,272, filed Sept. 5, 1980, now abandoned.

TECHNICAL FIELD AND BACKGROUND ART

This invention relates to electrically heated windows and the like. More particularly, it relates to an electrically heatable transparent sheet comprising an electrically conductive thin layer with a surface resistance of 1 to 10 ohms per square surface which is applied to a transparent substrate and connected to current-bearing electrodes.

Various types of electrically heatable windows are known whose heating resistor is a transparent thin resistive layer. They are, for example, used as sight plates to prevent the impairment of transparency by moisture precipitation. The transparent thin resistive layer may be made from a wide variety of materials. Typically metallic layers, particularly of gold and silver, are used; but layers are also used which are based on metallic compounds, particularly layers of tin oxide or indium oxide or corresponding mixed layers. The layers can be produced by vacuum evaporation or sputtering of the corresponding metals in vacuum, by spraying of solutions of the metallic compounds and subsequent pyrolytic dissociation and also by ion diffusion. They can furthermore be applied either directly to a surface of a silicate glass plate or to another transparent substrate, such as a transparent plastic film, which is combined with one or several silicate glass plates in a laminated glass plate. All these various types belong to the state of the art.

Frequently the current density in extremely thin resistance layers is very high, so that these layers are frequently operated close to their capacity. The current density is particularly high at points where inhomogeneities exist within the resistive layers. Such inhomogeneities can rapidly lead to a local overloading of the resistive layers by current peaks. Such an inhomogeneity is also represented by the abrupt transition from the relatively low-resistance electrodes to the relatively high-resistance resistive layer. Consequently the points of transition from the electrodes to the thin resistive layers are frequently the critical points in such heated plates where locally restricted current peaks are easily generated. At these points the resistive layer may char and lose its conductivity. If this happens, other points must then carry even more current, with the result that they become overloaded and also char. In the most unfavorable case, a charred line finally is generated all along the interface between the resistive layer and the electrode which interrupts current altogether.

DISCLOSURE OF INVENTION

It is the purpose of the invention to improve the electric coupling of electrodes to the thin resistive layers in electrically heated windows of the type described above and thereby reduce the danger of the formation of local current peaks leading to the destruction of the resistive layers.

Several embodiments are disclosed for solving this problem.

In one embodiment of the invention, the boundary between the electrode and the resistive layer has approximately a sinusoidal shape. This substantially lengthens the boundary through which current flows between the electrode to the resistive layer, without creating sharp points in the boundary, which again would lead to locally higher current densities with the described consequences.

Good results can be otained by this method, if the boundary is made of a series of half-sinusoidal waves, with each half wave having preferably a length of 0.5 to 2 cm. and an amplitude of also approximately 0.5 to 2 cm. Under these conditions the length of the boundary is approximately doubled, so that the average current density is reduced to one-half.

In a second embodiment of the invention, a straight-edged electrode is formed with a cross-section that declines in a wedge-like manner in the direction toward the edge of the electrode. The thickness of the electrode is reduced steadily over a distance of 0.5 to 2 cm from the normal thickness of the electrode to a thickness corresponding to that of the thin resistive layer.

In this embodiment, too, an abrupt transition between the electrode and the thin resistive layer is avoided and a smooth current transition is obtained because the surface resistivity of the electrode increases toward the edge of the electrode and approaches the surface resistivity of the thin layer. Thus a smooth transition is obtained between the "low-resistance" electrode and the "high-resistance" resistive layer.

In a third embodiment of the invention, a high resistivity contact-making layer is located between the thin resistive layer and the electrode. Preferably the resistivity of the contact-making layer is between 50 and 500 times higher than the resistivities of the materials of the thin layer and the electrode, which are of the same order of magnitude even though their surface resistances differ greatly. Good results are obtained, for example, if the thickness of the contact-making layer is such that the voltage drop in the contact-making layer is 0.1 to 1%, preferably approximately 0.5%, of the operating voltage.

This solution is based on the fact that the electrode and the resistive layer touch only at certain points and a homogeneous contact between an electrode and the resistive layer cannot be obtained. Moreover, current transfer between the electrode and the resistive layer takes place primarily at the leading edge of the electrode so that the contact points of interest lie along this edge. If, however, a contact-making layer is located between the electrode and the resistive layer, the contact points are, in effect, provided with series resistors, which limit the high current peaks because of the increased voltage drop in the series resistance. This leads to more uniform transfer of the current in spite of inhomogeneous contacts.

In another embodiment of the invention, the electrodes are made of a material which has a resistivity which is approximately two to five times higher than the resistivity of the thin resistive layer. The effect of this is similar to that of the third embodiment, with the difference that the "series resistors" for the contact points between the electrode and the resistive layer are now formed by the electrode material itself.

As will be apparent, further improvements can be obtained if the methods described above are combined or added to each other.

BRIEF DESCRIPTION OF THE DRAWINGS

These and other elements, features, objects and advantages of the invention will be more readily apparent from the following detailed description of the invention in which.

BEST MODE FOR CARRYING OUT THE INVENTION

Figure 1:
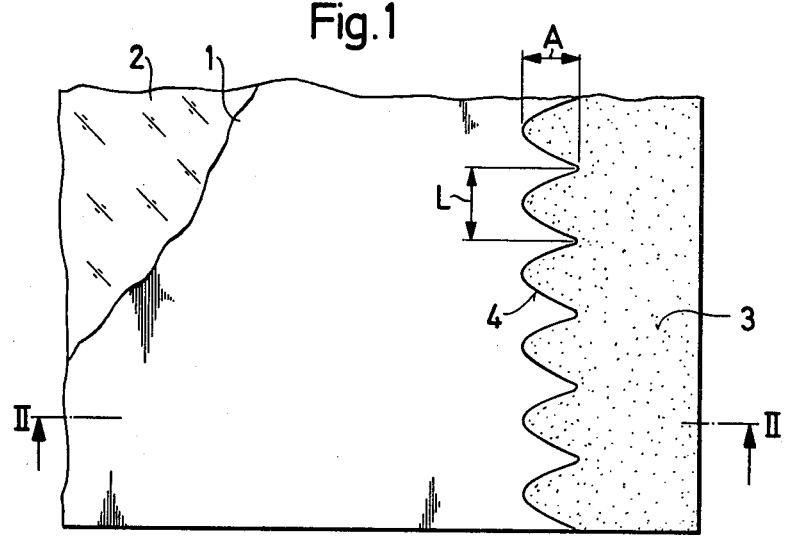
FIG. 1 shows a partial view of a first illustrative embodiment of a heatable window of my invention.

FIG. 1 shows part of a silicate glass plate 2 carrying an electrically resistive film 1, with an electrode 3 at the edge of glass plate 2 serving as a lead for electrical current. As will be apparent to those skilled in the art, the electrical circuit to film 1 is completed by a second electrode not shown in FIG. 1. Typically, the second electrode is similar in construction to electrode 3 and is located at the opposing left-hand edge of glass plate 2.

Resistive layer 1 illustratively is an indium-tin oxide layer applied by pyrolysis with a surface resistance of 6 ohms per square surface. Numerous other resistive layers may be used having, in general, surface resistances ranging from approximately 1 to 10 ohms per square surface. Electrode 3 is a conductive silver layer, as known for this purpose, applied by printing, for example by screen printing. Electrode 3 has a thickness of approximately 20 um and a surface resistance of 0.01 ohms per square surface. Resistive layer 1 extends underneath electrode 3 to the edge of the glass plate. Due to the great difference in the surface resistances of the two layers which are in contact with each other, current flow between electrode 3 and resistive layer 1 is concentrated at boundary 4. In accordance with the invention, in order to reduce the current density, said boundary 4 has the shape of sequential sinusoidal half waves or of rounded peaks or teeth, which extend outward on resistive layer 1 toward the other electrode. The amplitude A of the half waves is approximately 0.5 to 2 cm. and the length L of the half waves is also approximately 0.5 to 2 cm. Preferably, the amplitude A and length L of the half-waves are both about 1 cm.

If, instead of the sinusoidal design of the boundary 4 shown, another geometric shape is used for lengthening boundary 4, care should be taken that no sharp points are directed outward on resistive layer 1, but that only undulating, round or rounded shapes are chosen which ensure the most homogeneous current density along the border.

Figure 2:
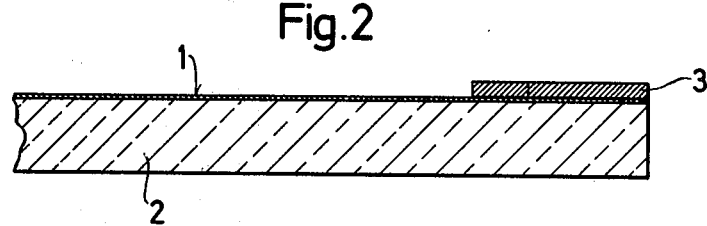
FIG. 2 shows a cross-section along line II—II of the heatable window shown in FIG. 1.

The thickness of electrodes 3 may be uniform over their entire area, i.e., including the sinusoidal protrusions, as shown in FIG. 2. The current transfer between electrode 3 and resistive layer 1 will, however, become even more uniform when the thickness of the electrodes continually decreases near the boundary with layer 1, for instance over a width corresponding to amplitude A of the sinusoidal protrusions.

Figure 3:
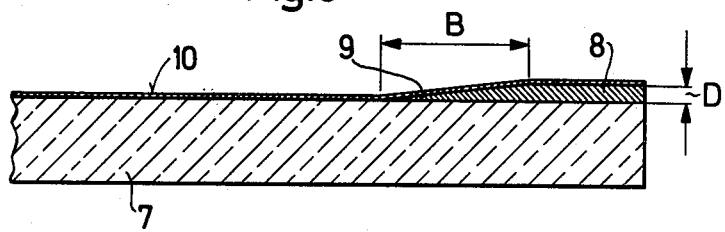
FIG. 3 shows a cross-section of part of a second illustrative embodiment of a heatable window of my invention.

In the embodiment partially shown in FIG. 3, electrode 8 is first applied to a silicate glass plate 7 and a resistive layer 10 is then applied to the surface of glass plate 7 and of electrode 8. Electrode 8 is again a silver enamel of good conductivity and terminates in a straight edge 9. Resistive layer 10 is a gold or silver layer deposited in a high vacuum, with a light transmission of approximately 80%. Resistive layer 10 can also be a multilayer structure with layers of metallic compounds below and/or above the metal layer which have various functions, such as improving the adhesion of the metal layer, optical coupling of the metal layer to the substrate, protecting the metal layer, etc. Layers of zinc sulfide, titanium oxide, magnesium fluoride and other substances are known and used for these purposes.

In the area adjoining the edge of glass plate 7, the thickness D of electrode 8 is approximately 20 um. This section of the electrode usually has the purpose of conducting the electric current over its entire length with minimum losses. Adjoining this area of uniform thickness there lies, in the outward direction on resistive layer 10 toward the other electrode (not shown), an area with tapered cross section, with the thickness D of the electrode decreasing over width B of the tapered area to zero or the thickness of the thin resistive layer 10. Electrode 8 is in contact with resistive layer 10 over the entire distance B. Due to the wedge-shaped design of the electrode cross-section, the surface resistance (i.e., resistance per square surface) of the electrode increases in the direction toward the tip of the wedge, i.e., in the outward direction on resistive layer 10. Consequently the contact resistance increases in the critical area and the current transfer takes place smoothly in a larger portion of the electrode, thereby reducing the current density.

The width B of the wedge-shaped part of electrode 8 is approximately 0.5 to 2 cm, preferably approximately 1 cm. Electrode 8 can, of course, also be placed on top of resistive layer 10.

By the selection of compounds or materials with a higher specific resistance (i.e., resistivity), improved connection between the electrodes and the resistive layer can also be obtained both for simple straightedged electrodes and for electrodes with widely varying geometric shapes as described with the aid of FIGS. 1 to 3. While usually the resistivity of the electrodes is approximately equal to the resistivity of the material of the resistive layer, according to one embodiment of the invention a material is used for the electrodes which has a resistivity which is at least twice as high and preferably up to five times as high as that of the material of the thin resistive layer. Again, the use of such material improves the distribution of current density at the interface between the electrode and the resistive layer.

Figure 4:
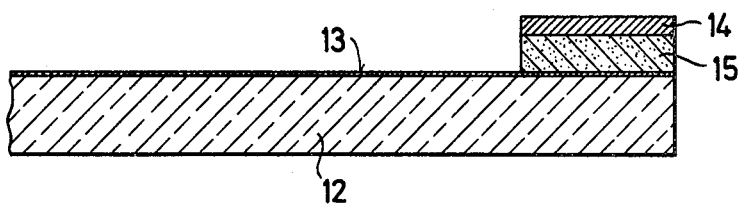
FIG. 4 shows a cross-section of part of a third illustrative embodiment of a heatable window of my invention.

In the embodiment partially show in FIG. 4, a resistive layer 13 is applied to a silicate glass plate 12. Current is fed to layer 13 through an electrode 14 that is made of a material with low resistivity. For example, electrode 14 may be a 0.1 mm-thick copper film. A contact-making layer 15 with higher specific resistivity that that of layer 13 and electrode 14 is placed between electrode 14 and resistive layer 13. Preferably, the resistivity of contact-making layer 15 is between 50 and 500 times greater than that of the resistivities of the materials of the resistive layer 13 and electrode 14, which are of the same order of magnitude even though their surface resistances are quite different. The thickness of layer 15 should be such that a voltage drop of 0.1 to 1%, and preferably 0.5% of the operating voltage occurs within layer 15. For example, if the operating voltage is 24 volts and resistive layer 13 has a surface resistance of 2 ohms per square surface, the contact-making layer is preferably made of a 0.5 mm. thick layer of a graphite-containing material which can be applied in paste form and whose resistivity is 10 milliohm×cm after hardening. More generally, the contact-making layer can be made of electrical conductive particles such as graphite, silver and copper contained in a hardenable organic binder. To facilitate fabrication of this type of heated window, it is preferable that the conductive material of layer 15 be applicable to layer 13 in the form of a paste and that it be suitable for printing.

Figure 5:
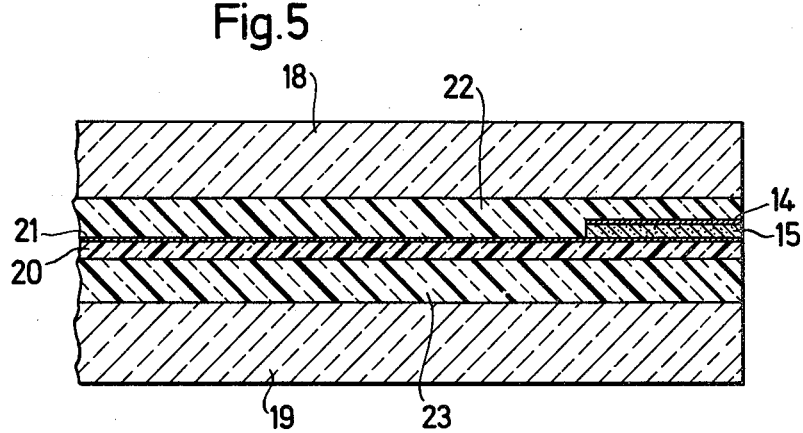
FIG. 5 shows a cross-section of part of a first illustrative embodiment of a heatable laminated window of my invention.

FIG. 5 shows an electrically heatable laminated window comprising two outer silicate glass plates 18, 19, two adhesive films 22, 23 and a polyester film 20 to which a resistive layer 21 is applied on one side. Glass plates 18, 19 and polyester film 20 are glued together by adhesive films 22, 23. Polyester film 20 serves as a substrate for resistive layer 21 and is 50 um thick. To form resistive layer 21, a layer of zinc sulfide is first deposited by vacuum evaporation, which acts on the one hand as a primer and on the other hand as an optical coupler for reducing reflection and thus increasing transmission. The conductive layer itself consists of silver and is deposited by vacuum evaporation on this zinc sulfide layer. Its thickness is such that the light transmission is approximately 80%. This silver layer is in turn followed by another zinc sulfide layer to complete the resistive layer 21. Electrode 14 is applied to this resistive layer 21 with contact-making layer 15 in between. Details of the electrode construction have been explained with the aid of FIG. 4.

Figure 6:
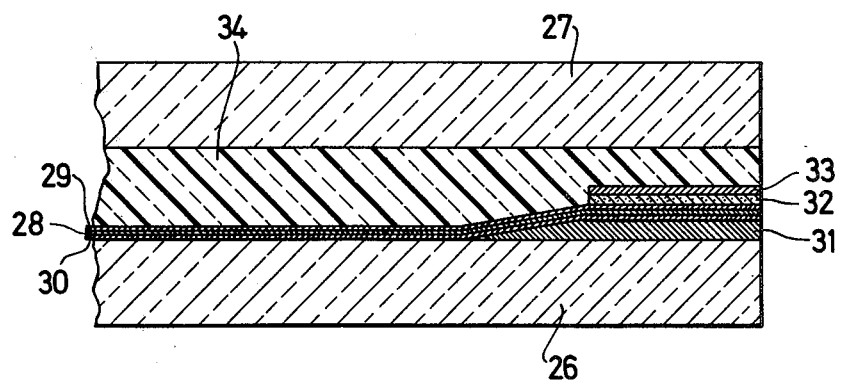
FIG. 6 shows a cross-section of part of a second illustrative embodiment of a heatable laminated window of my invention.

FIG. 6 shows another embodiment of a heatable laminated window. In this instance, a glass plate 26 serves as a substrate for a thin resistive layer and an electrode 31. Electrode 31 is a copper-titanium alloy applied by flame spraying before the vacuum evaporation step. During the spraying operation a mask was placed at a distance of 10 mm from the glass surface. Because of this arrangement there is no sudden transition between the electrode and the resistive layer, but the thickness of the electrode is steadily reduced to zero over a distance of 1 cm, thus ensuring the desired "matching" of the low-resistance electrode to the high-resistance resistive layer. The resistive layer comprises a conductive layer 28 and two optical coupling layers 29, 30. Conductive layer 28 is made of silver; and optical coupling layers 29, 30 above and below silver layer 28 are made of titanium oxide. All three layers are deposited in a vacuum by thermal methods. A contact-making layer 32 of a graphite-containing compound is applied to top layer 20 above electrode 31 and a 0.1 mm thick copper foil strip is placed on top of layer 31. Electrodes reinforced in this manner are particularly suitable if high currents are required for operating the heated window. The laminated structure is covered by a glass plate 27 which is attached by means of an adhesive polyvinyl butyral layer 34 to coated glass plate 26 carrying the electrodes.

As will be apparent, numerous variations and combinations may be made in the above-described embodiments within the spirit and scope of my invention.

What is claimed is:

1. An electrically heatable transparent sheet comprising:
   a transparent substrate;
   an electrically conductive thin layer which covers substantially all the surface area of at least one side of said transparent substrate and has a surface resistance of 1 to 10 ohms per square surface; and
   current-bearing layer electrodes mounted on and parallel to said thin layer and electrically connected to said thin layer, with the edge of at least one of said electrodes on the side which faces toward the other electrode having a shape which comprises a series of undulations in electrical contact with said thin layer so as to increase the length of a boundary existing between said one current-bearing electrode and said thin layer thereby reducing the density of current flow between said electrode and said thin layer so as to reduce charring along said boundary.

2. The electrically heatable transparent sheet of claim 1, characterized in that said edge of said electrode has the shape of a series of half-sinusoidal waves.

3. The electrically heatable transparent sheet of claim 1 wherein the edge of at least one of said electrodes has a shape comprised of a series of half-sinusoidal waves, with each wave having a length of approximately 0.5 to 2.0 cm and an amplitude of approximately 0.5 to 2.0 cm.

4. The electrically heatable transparent sheet of claim 3 wherein the half-sinusoidal waves have a length of approximately 1 cm and an amplitude of approximately 1 cm.

* * * * *